US007729610B2

(12) United States Patent
Tomatsu

(10) Patent No.: US 7,729,610 B2
(45) Date of Patent: Jun. 1, 2010

(54) IMAGING APPARATUS AND LIGHT SHIELDING MEMBER

(75) Inventor: Kei Tomatsu, Hyogo (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 11/749,462

(22) Filed: May 16, 2007

(65) Prior Publication Data

US 2007/0280674 A1 Dec. 6, 2007

(30) Foreign Application Priority Data

Jun. 5, 2006 (JP) ............................ 2006-156005

(51) Int. Cl.
*G03B 13/06* (2006.01)
*G03B 13/02* (2006.01)
*G02B 27/00* (2006.01)

(52) U.S. Cl. ........................ 396/382; 398/383; 359/601

(58) Field of Classification Search ................. 396/346, 396/378, 379, 382, 383
See application file for complete search history.

(56) References Cited

U.S. PATENT DOCUMENTS

| | | | | |
|---|---|---|---|---|
| 4,576,459 | A * | 3/1986 | Miura et al. | 396/534 |
| D433,434 | S * | 11/2000 | Hamamura | D16/217 |
| D450,739 | S * | 11/2001 | Nojima et al. | D16/217 |
| D451,940 | S * | 12/2001 | Haga | D16/217 |
| 6,637,881 | B1 * | 10/2003 | Siminou | 351/200 |
| 2005/0140815 | A1 * | 6/2005 | Nakano et al. | 348/345 |

FOREIGN PATENT DOCUMENTS

| | | |
|---|---|---|
| JP | 06-194719 | 7/1994 |
| JP | 08-110549 | 4/1996 |
| JP | 11-160603 | 6/1999 |
| JP | 2002-040520 | 2/2002 |
| JP | 2003-248256 | 9/2003 |

OTHER PUBLICATIONS

Waller, Matthew (May 25, 2006). “Pentax *ist DL Digital SLR—Digital Camera Review.” Digicamreview. Accessed Feb. 25, 2009 http://web.archive.org/web/20060525045647/http://www.digicamreview.co.uk/pentax_ist_dl_dslr_review.htm).*
Selected pages from the Pentax SLR Digita Camera *ist DL operating manual, copyright 2005. Specifically pp. 14, 15, 22, and 39.*

* cited by examiner

*Primary Examiner*—W. B. Perkey
*Assistant Examiner*—Noam Reisner
(74) *Attorney, Agent, or Firm*—Oblon, Spivak, McClelland, Maier & Neustadt, L.L.P.

(57) ABSTRACT

There is provided an imaging apparatus having (a) an eyepiece type viewfinder formed on a predetermined plane of the imaging apparatus; (b) an operation member for diopter adjustment of said viewfinder; and (c) a light shielding member for suppressing entrance of external light into said viewfinder, the light shielding member protruding from the predetermined plane around the viewfinder by a constant height. In the apparatus, the operation member is disposed not to protrude from an outer border of the predetermined plane, and a recess is formed in the light shielding member above the operation member so that the operation member is substantially accommodated in the recess inner than an opening edge of the recess.

7 Claims, 9 Drawing Sheets

IMAGING APPARATUS AND LIGHT SHIELDING MEMBER

BACKGROUND OF THE INVENTION

1. Field of the Invention

The present invention relates to a technique regarding an imaging apparatus equipped with an operation member for diopter adjustment of a viewfinder.

2. Description of Related Art

A single-lens reflex camera (imaging apparatus) is equipped with an optical viewfinder for optically displaying a photographing range of a subject (refer to Japanese Patent Unexamined Publication No. 2005-221602).

As shown in FIG. 15, which is an enlarged view near an optical viewfinder, some optical viewfinders are equipped with a diopter adjusting dial 92 for diopter adjustment of an optical viewfinder.

SUMMARY OF THE INVENTION

However, the above-described diopter adjusting dial has a protrusion portion 92*t* (FIG. 15) protruding from an outer surface of the camera so as to allow a user to touch the protrusion portion with a finger and rotate the dial. An unexpected inadvertent operation of touching the protrusion with a user finger may possibly shift the diopter state carefully set by the user.

The present invention has been made in view of the above-described issue. According to an embodiment of the present invention, there is provided a technique regarding an imaging apparatus capable of preventing an inadvertent operation of diopter adjustment of a viewfinder.

According to a first aspect of the present invention, there is provided an imaging apparatus comprising: (a) an eyepiece type viewfinder formed on a predetermined plane of the imaging apparatus; (b) an operation member for performing diopter adjustment of the viewfinder; and (c) a light shielding member for suppressing entrance of external light into the viewfinder, the light shielding member protruding from the predetermined plane around the viewfinder by a constant height. In the apparatus, the operation member is disposed not protruding from an outer border of the predetermined plane, and a recess is formed in the light shielding member above the operation member so as to substantially accommodate the operation member in the recess and within an opening edge of the recess.

According to a second aspect of the present invention, there is provided a light shielding member for suppressing entrance of external light into a viewfinder of an eyepiece type, and protruding from a predetermined plane of an imaging apparatus around the viewfinder by a constant height. The light shielding member is provided with a predetermined recess formed within the light shielding member; an operation member for diopter adjustment of the viewfinder disposed in the imaging apparatus, not protruding from an outer border of the predetermined plane; and the predetermined recess formed above the operation member so as to substantially accommodate the operation member in the recess and within an opening edge of the recess.

The "predetermined plane" is not limited to a plane (e.g., a rear plane and an upper plane) fixedly defined in the imaging apparatus, but may be a mount plane of a viewfinder if an angle of a display plane (or the mount plane of the viewfinder) changes about a predetermined rotary shaft in a viewfinder such as an EVF.

According to the embodiment of present invention, the operation member mounted on the predetermined plane of the imaging apparatus, for diopter adjustment of the eyepiece type viewfinder, is disposed not to protrude from the outer border of the predetermined plane, the recess is formed in the light shielding member above the operation member, the light shielding member protrudes from the periphery of the viewfinder by a constant height for suppressing entrance of external light into the viewfinder, and the operation member is substantially accommodated in the recess and within the opening edge of the recess. Accordingly, it is possible to prevent inadvertent operation regarding diopter adjustment of the viewfinder.

DESCRIPTION OF THE EMBODIMENT

Embodiment

<Outer Structure of Imaging Apparatus>

Figure 5:
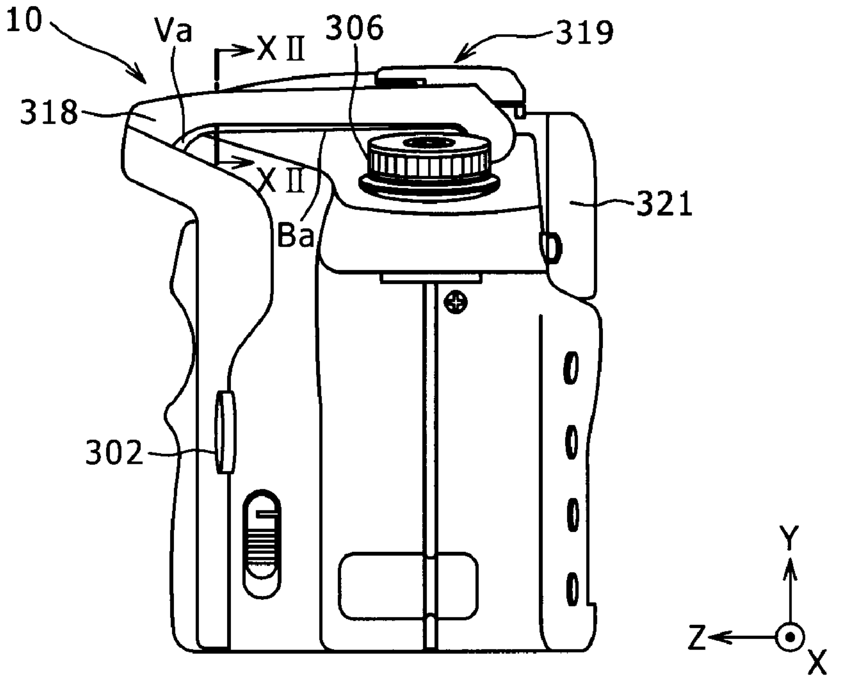
FIG. 5 is a diagram showing the outer structure of the imaging apparatus.
Figure 6:
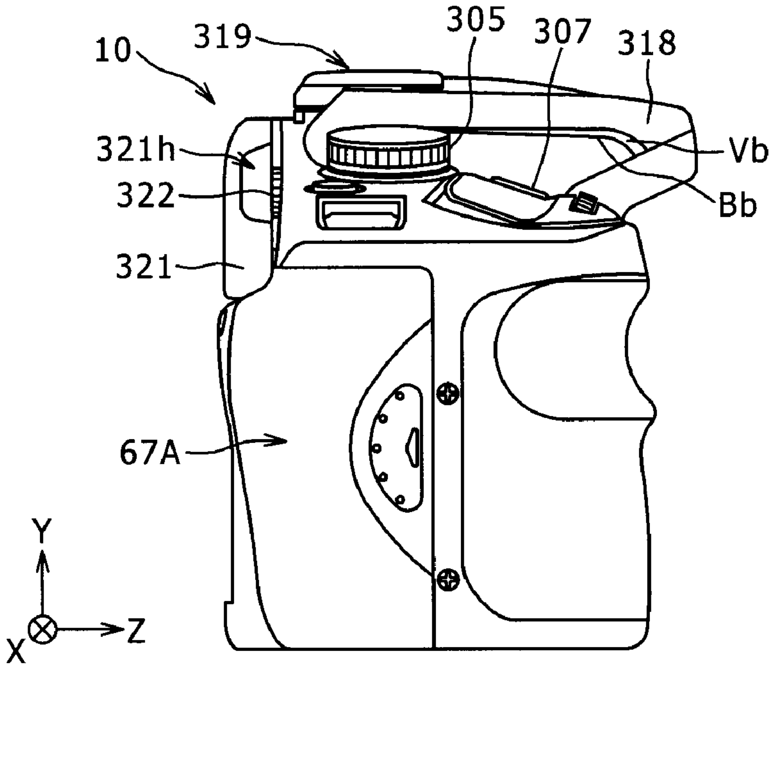
FIG. 6 is a diagram showing the outer structure of the imaging apparatus.
Figure 7:
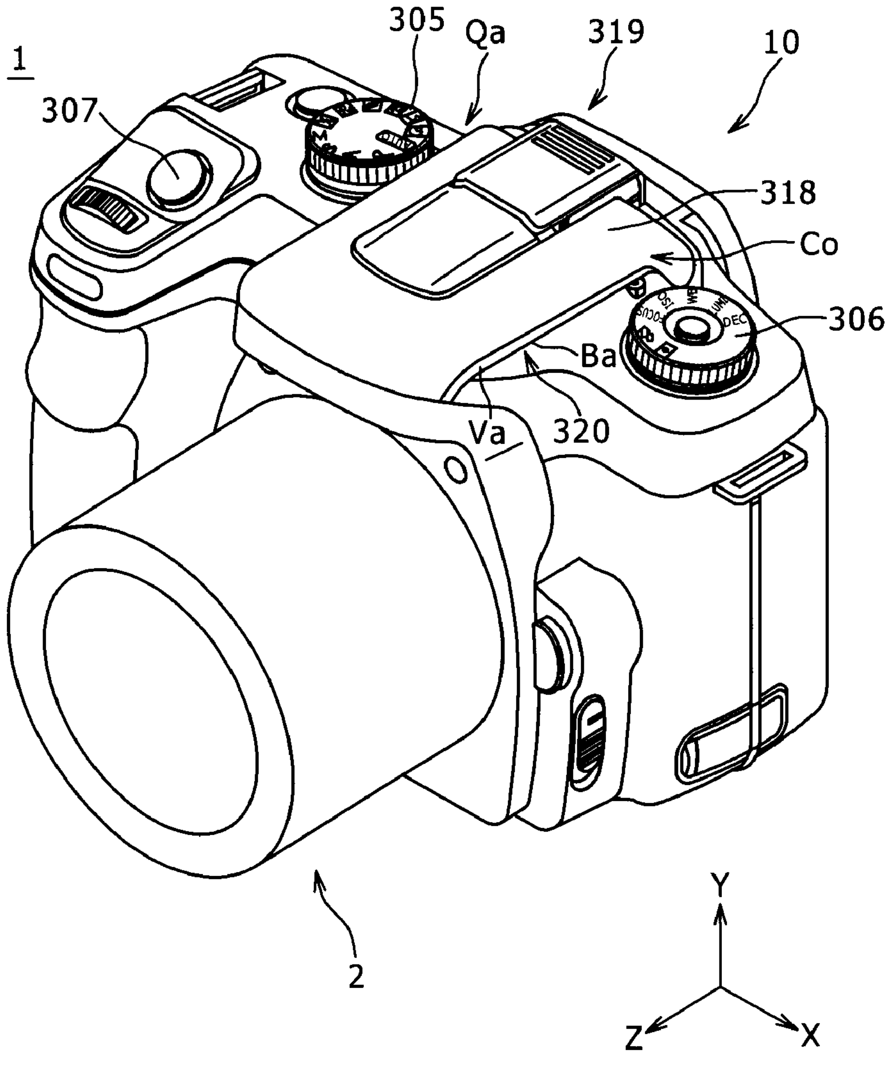
FIG. 7 is a perspective view of a camera system in which an interchangeable lens is mounted on the imaging apparatus.

FIGS. 1 to 6 are diagrams showing an outer structure of an imaging apparatus 10 according to an embodiment of the present invention. FIGS. 1 to 6 are a front view, a rear view, a top view, a bottom view, a left side view and a right side view, respectively. The imaging apparatus 10 is capable of mounting and dismounting an interchangeable lens (photographing lens) 2. FIG. 7 is a perspective view of a camera system (imaging system) 1 having an interchangeable lens 2 mounted on the imaging apparatus 10. This camera system 1 functions, for example, as a single-lens reflex digital still camera.

Figure 1:
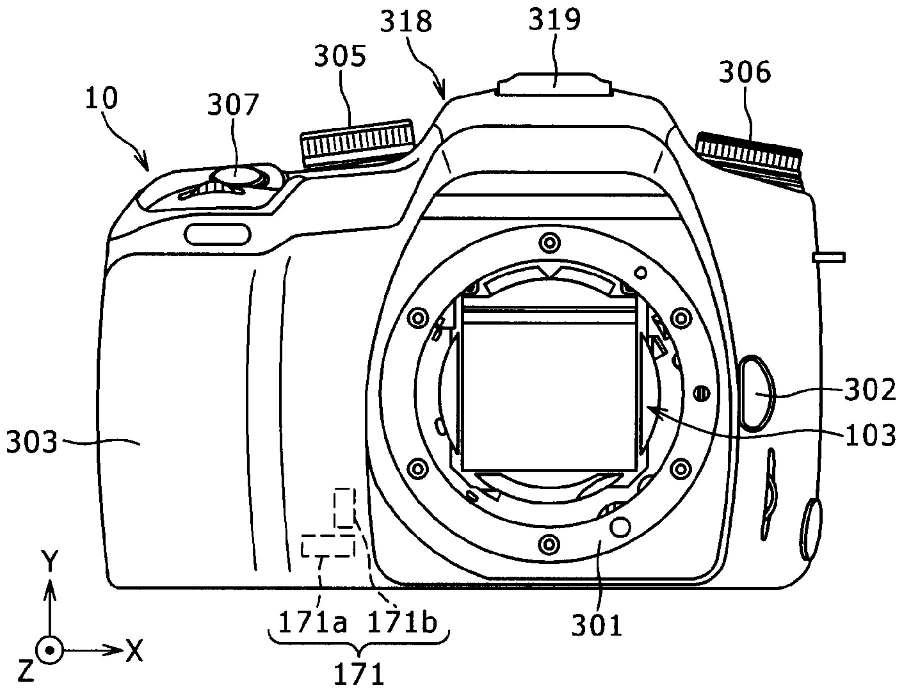
FIG. 1 is a diagram showing an outer structure of an imaging apparatus according to an embodiment of the present invention.

Referring to FIG. 1, on the front side of the imaging apparatus 10, there are provided: a mount unit 301 on which an interchangeable lens 2 is mounted at substantially the front center thereof; a lens exchange button 302 disposed to the right side of the mount unit 301; a grip portion 303 protruding in a front left end portion (left side in an X direction) and allowing a user to securely grasp (hold) with one hand (or both hands); a mode setting dial 305 disposed in a front upper left portion (upper left side in a Y direction); a control value setting dial 306 disposed in a front upper right portion; and a shutter button 307 disposed on the top plane of the grip portion 303.

Figure 2:
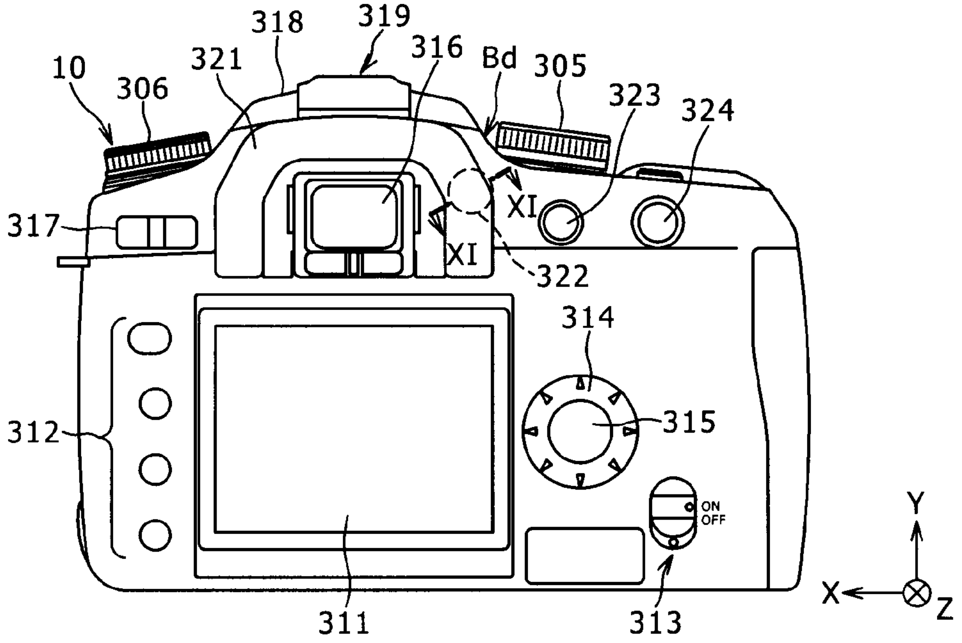
FIG. 2 is a diagram showing the outer structure of the imaging apparatus.

Referring to FIG. 2, on the rear side of the imaging apparatus 10, there are equipped: a liquid crystal display (LCD) 311; a setting button group 312 disposed to the left of LCD 311; a multi-direction key 314 disposed to the right of LCD 311; a push button 315 disposed in the center area of the multi-direction key 314; and a camera shake correction switch 313 disposed to the lower right of the multi-direction key 314. On the rear side of the imaging apparatus 10, there are also equipped: an optical viewfinder 316 disposed above the LCD 311; an eye cup 321 surrounding the periphery of the optical viewfinder 316; a diopter adjusting dial 322 hidden behind the eye cup 321; a main switch 317 disposed to the left of the optical viewfinder 316; an exposure correction button 323 and an AE lock button 324 disposed to the right of the optical viewfinder 316, a flash unit 318 disposed above the optical viewfinder 316; a housing 320 (FIG. 8) for housing the flash unit 318; and a connection terminal portion 319.

The mount unit 301 is a portion for mounting the interchangeable lens 2, and is equipped with a plurality of electrical contacts for electrical connection, a coupler for mechanical connection and the like.

The lens exchange button 302 is depressed when the interchangeable lens 2 mounted on the mount unit 301 is to be dismounted.

The grip portion 303 is used for a user to hold the imaging apparatus 10 during photographing, has an irregular surface in conformity with finger shapes to improve fittability. A battery housing 69A (FIG. 4) and a card housing 67A (FIG. 6) are formed inside the grip portion 303. A battery as a camera power source is accommodated in the battery housing 69A, and a recording medium (e.g., a memory card) for recording image data of photographed pictures is accommodated removably in the card housing 67A. The grip portion 303 may be equipped with a grip sensor for detecting whether or not a user holds the grip portion.

The mode setting dial 305 and the control value setting dial 306 are each made of a member of nearly a disc shape capable of rotating in a plane substantially parallel to the upper surface of the imaging apparatus 10. The mode setting dial 305 is used for selectively setting a mode and a function provided in the imaging apparatus. Modes and functions include an auto exposure (AE) control mode, an auto focus (AF) control mode, various photographing modes such as a still image photographing mode for photographing a single still image and a continuous photographing mode for continuous photographing, and a reproduction mode for reproducing already recorded images. The control value setting dial 306 is used for setting control values of various functions provided in the imaging apparatus 10.

The shutter button 307 is a depression switch capable of a "half depression" operation of depressing the shutter button to an intermediate depth and a "full depression" operation of depressing further the shutter button. In the still image photographing mode, as the shutter button 307 is half depressed (S1), a preliminary operation (such as exposure control value setting and focus adjusting) is performed for photographing a still image of a subject, and as the shutter button 307 is fully depressed (S2), a photographing operation is performed (a series of operations of exposing an imaging sensor, processing an image signal obtained by exposure, in a predetermined manner, and recording the processed image signal in a memory card or the like).

The LCD 311 is constituted of a color liquid crystal panel, displays an image taken with an imaging device 101 (refer to, e.g., FIG. 10), reproduces an already recorded image, displays a setting screen for the functions and modes provided in the imaging apparatus 10, and perform other operations. Instead of the LCD 311, an organic EL or a plasma display may also be used.

The setting button group 312 includes switches for managing various functions provided in the imaging apparatus 10. The setting button group 312 includes a selection setting switch for setting the contents selected in a menu screen displayed on the LCD 311, a selection cancelling switch, a menu display switch for switching between contents of the menu screen, a display on/off switch, a display enlarging switch and the like.

The shake correction switch 313 is a button for supplying an operation signal to execute a shake correction operation by a shake correction unit 200 to be later described. The shake correction switch 313 is depressed by a user to make the imaging apparatus 10 perform a shake correction operation, when the user feels anxiety that the "shake" such as a camera shake may affect a photographed image in a hand-held shooting, a telephoto shooting, a shooting in the dark, a long exposure shooting or the like.

The multi-direction key 314 has a ring member provided with a plurality of pressing parts (triangle symbol parts in FIG. 2) disposed at a constant pitch in a circumferential direction, and is structured in such a manner that a depression operation of the pressing part is detected with a contact (switch) provided for each pressing part and not shown in FIG. 2. The push button 315 is disposed in the center of the multi-direction key 314. The multi-direction key 314 and the push button 315 are used for changing a shot magnification (moving a zoom lens in a wide-angle or telephoto direction), feeding each frame of recorded images to be reproduced on the LCD 311, setting shooting conditions (aperture value, shutter speed, presence/absence of flash emission and the like), and for other operations.

The optical viewfinder 316 is an eyepiece type viewfinder mounted on the back of the imaging apparatus 10 to optically display a shot range of a subject. Namely, a subject image is guided from the interchangeable lens 2 to the optical viewfinder 316, and as a user views the optical viewfinder 316, the subject to be actually photographed with the imaging device 101 can be visually recognized.

The main switch 317 is constituted of a two-contact slide switch capable of being slid right and left. When the main switch is set to the left, a power source of the imaging apparatus 10 is turned on, and when it is set to the right, the power source is turned off.

Figure 8:
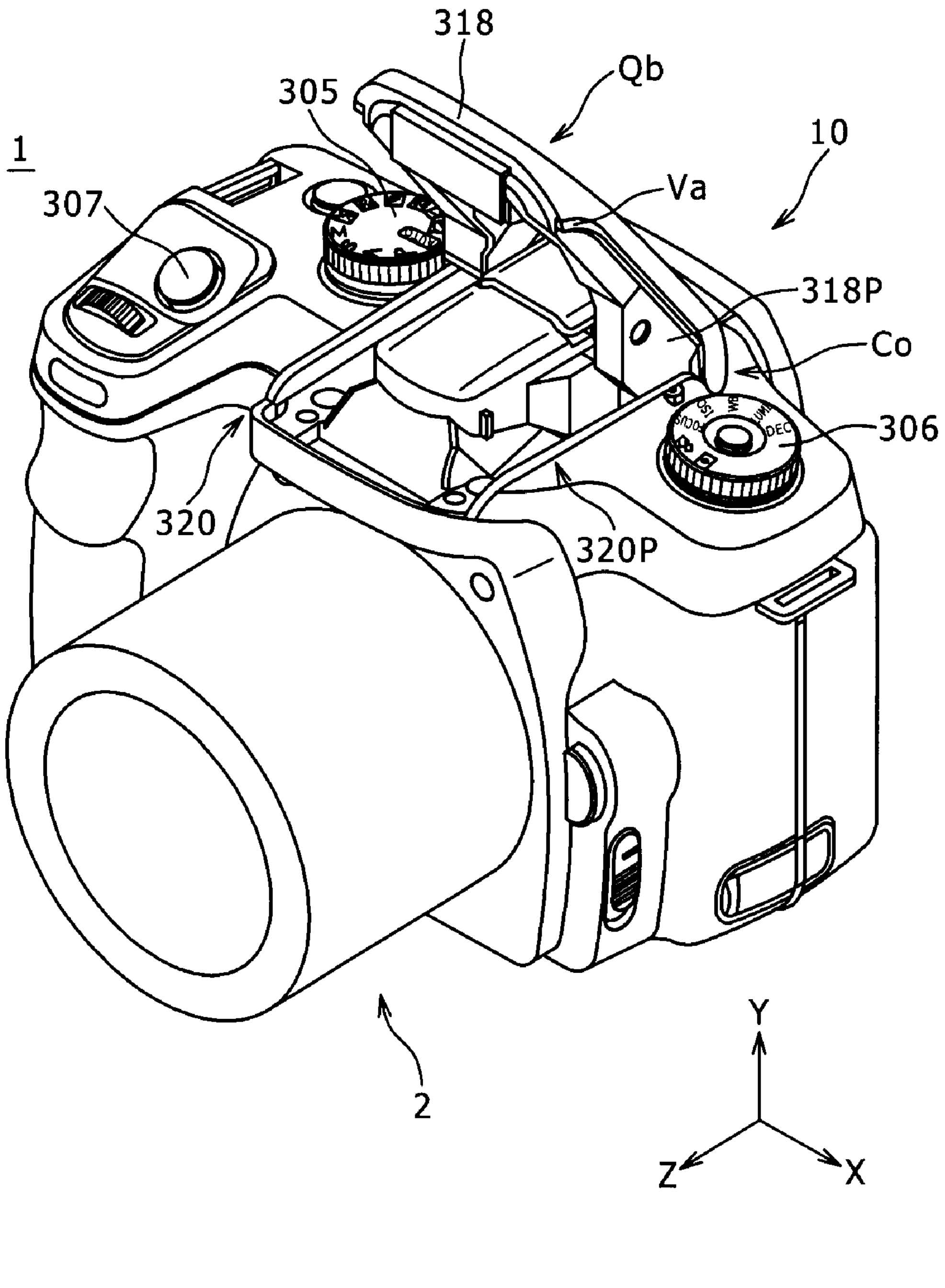
FIG. 8 is a diagram showing a flash unit at its upright position.

The flash unit 318 is constituted of a built-in flash of a pop-up type, and can be switched between a prostrate position Qa shown in FIG. 7 and a pop-up position Qb shown in FIG. 8 by rotating about a rotary shaft Co (FIGS. 7 and 8).

As shown in FIG. 8, the housing 320 has a recess 320*p* for loading a protrusion portion 318*p* protruding under the flash unit 318. Therefore, in the prostrate position Qa shown in FIG. 7, the lower portion of the flash unit 318 is loaded in the recess 320*p* of the housing 320, and the flash unit 318 becomes integral with the outer shape of the imaging apparatus 10.

Figure 3:
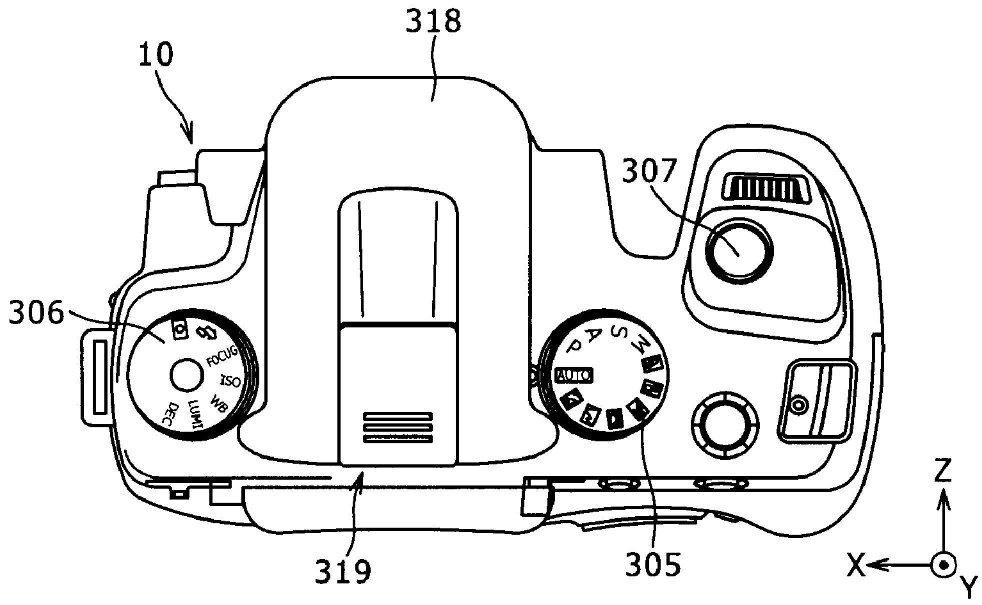
FIG. 3 is a diagram showing the outer structure of the imaging apparatus.

When an external flash or the like is to be mounted on the imaging apparatus 10, the external flash is connected using the connection terminal 319. In FIGS. 3, 7 and other figures, a terminal cap is shown mounted on the connection terminal 319.

The eye cup 321 is a substantially U-shaped light shielding member having light shielding property, and is mounted on or dismounted from the back of the imaging apparatus 10 to facilitate exchange of the eye cup. As shown in FIGS. 5 and 6, the eye cup 321 protrudes from the peripheral area of the optical viewfinder 316 by a constant height from the rear plane of the imaging apparatus 10 to provide a role of suppressing incidence of external light into the optical viewfinder 316.

The diopter adjusting dial 322 has an outer shape of disc and is a member for diopter adjustment of the optical viewfinder 316.

The exposure correction button 323 is used for manually adjusting an exposure value (aperture value and shutter speed), and the AE lock button 324 is used for fixing an exposure.

As indicated by broken lines in FIG. 1, a shake detection sensor 171 is mounted at a proper position of the imaging apparatus 10. The shake detection sensor 171 detects a shake applied to the imaging apparatus (camera body) 10 by a camera shake or the like. Assuming a two-dimensional coordinate system having the horizontal direction in FIG. 1 as an X-axis (pitch direction) and a direction perpendicular to the X-axis as a Y-axis (yaw direction), the shake detection sensor includes a pitch direction sensor 171*a* for detecting a camera shake in the pitch direction and a yaw direction sensor 171*b* for detecting a camera shake in the yaw direction. For example, the pitch direction sensor 171*a* and yaw direction sensor 171*b* are each made of, e.g., a gyro (angular velocity sensor) using a piezoelectric device, and detects an angular velocity of a shake in each direction.

The interchangeable lens 2 (FIG. 7) functions as a lens window for picking light (optical image) of a subject and constitutes a photographing optical system for guiding the subject light to the imaging device 101 to be described later and optical viewfinder 316 disposed in the imaging apparatus 10. By depressing the lens exchange button 302, the interchangeable lens 2 can be dismounted from the imaging apparatus 10.

Figure 9:
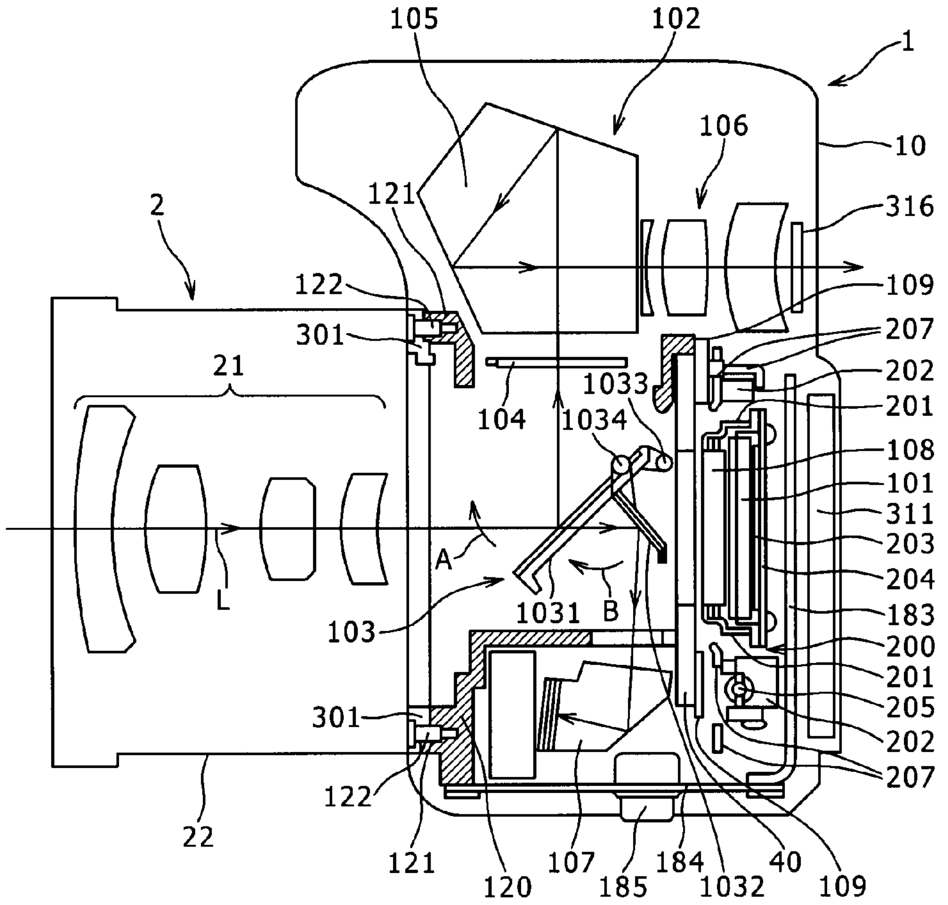
FIG. 9 is a vertical cross sectional view of the camera system.

The interchangeable lens 2 has a lens group 21 having a plurality of lenses disposed serially along an optical axis L (refer to FIG. 9). The lens group 21 includes a focus lens 211 (refer to FIG. 10) for adjusting a focus and a zoom lens 212 (refer to FIG. 10) for zooming, which lenses are driven along the optical axis L to perform zooming and focus adjustment. An operation ring is mounted on the circumferential surface of a camera cone 22 (refer to FIG. 9) of the interchangeable lens 2 and is rotatable along the circumferential surface of the lens barrel. The zoom lens 212 is moved manually or automatically in the optical axis direction in accordance with a rotation direction and amount of the operation ring, and a zoom magnification factor (shot magnification factor) is set in accordance with the position of the moved zoom lens.

Figure 4:
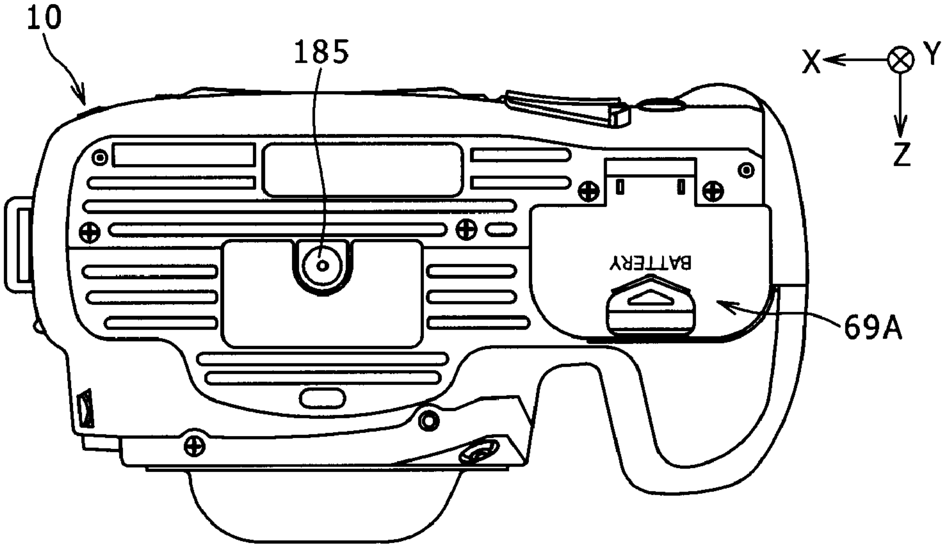
FIG. 4 is a diagram showing the outer structure of the imaging apparatus.

As shown in FIG. 4, a tripod mount unit 185 is provided on the bottom side of the imaging apparatus to mount a tripod for fixedly supporting the imaging apparatus 10.

<Internal Structure of Camera System 1>

Next, description will be made on the internal structure of the camera system 1. FIG. 9 is a vertical cross sectional view of the camera system 1. As shown in FIG. 9, equipped in the imaging apparatus 10 are the imaging device 101, a viewfinder unit (viewfinder optical system) 102, a mirror unit 103, a focus detection unit 107, the above-described shake detection sensor 171 and shake correction unit 200, a shutter unit 40 and the like.

The imaging device 101 is disposed along a direction perpendicular to the optical axis L of the lens group 21 of the interchangeable lens 2 mounted on the imaging apparatus 10. A CMOS color area sensor (CMOS type imaging device) is used as the imaging device 101. For example, the CMOS color area sensor has a plurality of pixels constituted of, e.g., photodiodes, and color filters of R (red), G (blue) and B (blue) of the Bayer array having different spectral characteristics are disposed on the light reception planes of pixels at a ratio of 1:2:1. The imaging device (photosensor) 101 converts an optical image of a subject focused by the lens group 21 into electric signals (image signals) of R (red), G (blue) and B (blue) components to output image signals of R, G and B colors.

The mirror unit 103 (reflection plate) is disposed on the optical axis L at a position where a subject optical image is reflected toward the viewfinder unit 102. The subject optical image passed through the interchangeable lens 2 is reflected upward by the mirror unit 130 (a main mirror 1031 to be described later) and focused on a focus plate 104 (focusing glass). Part of the subject optical image passed through the interchangeable lens 2 transmits through the mirror unit 103.

The viewfinder unit 102 has a pentaprism 105, an eyepiece 106 and the optical viewfinder 316. The pentaprism 105 has a pentagonal cross section, and changes the subject optical image incident from the lower surface to an erect image by exchanging up, down, right and left of the optical image through internal reflection. The eyepiece 106 guides the subject optical image changed to an upright image by the pentaprism 105 to the outside of the optical viewfinder 316. With this arrangement, the viewfinder unit 102 functions as an optical viewfinder for confirming a scene during photographing standby.

The mirror unit 103 is constituted of the main mirror 1031 and a sub mirror 1032. On the back side of the main mirror 1031, the sub mirror 1032 is swingably mounted to fall toward the back of the main mirror 1031. A portion of the subject optical image transmitted through the main mirror 1031 is reflected by the sub mirror 1032 and becomes incident upon the focus detection unit 107.

The mirror unit 103 described above is constituted as a so-called quick return mirror. During exposure, the mirror unit 103 pops up in a direction indicated by an arrow symbol A by using a rotary shaft 1033 as a swing fulcrum, and stops at a position under the focus plate 104. In this case, the sub mirror 1032 swings in a direction indicated by an arrow symbol B by using a rotary shaft 1034 as a swing fulcrum, relative to the back of the main mirror 1031. When the mirror unit 103 stops at the position under the focus plate 104, the sub mirror is in a folded state substantially parallel to the main mirror 1031. Therefore, the subject optical image from the interchangeable lens reaches the imaging device 101 without being intercepted by the mirror unit 103 so that the imaging device 101 is exposed. After the exposure, the mirror unit 103 resumes the original position (position shown in FIG. 9).

The focus detection unit 107 is constituted of a so-called AF sensor made of a range finding device for detecting focus information on a subject and the like. The focus detection unit 107 is disposed under the mirror unit 103, and detects an in-focus position by, e.g., a well-known phase difference detection method.

The imaging device 101 is held to be movable two-dimensionally on a flat plane perpendicular to the optical axis L in the shake correction unit 200. A low-pass filter 108 is disposed immediately before the imaging device 101 in the optical axis direction. The low-pass filter prevents incidence of infrared rays (IR cut) and generation of quasi color and color moire. A shutter unit 40 is disposed immediately before the low-pass filter 108. The shutter unit 40 has a screen member moving up and down, and is a mechanical focal plane shutter for conducting an open/close operation of an optical path of a subject optical image to be guided to the imaging device 101 along the optical axis L.

A frame body (front frame) 120 is disposed in the rear area of the mount unit 301 and substantially in the central area of the imaging apparatus 10 (refer to a hatched portion in FIG. 9). This frame body 120 is a rectangular cylindrical tubular body having substantially a rectangular shape as viewed from front and being opened in front and back portions and in an upper portion facing the pentaprism 105 (focus plate 104), and is made of a metal rigid body having a resistance against strain or the like. A mount reception portion 121 of a cylindrical shape matching the shape of the mount unit 301 is formed at the front plane of the frame body 120. The frame body 120 is mounted on the mount unit by a plurality of screws 122 from the front side, in the state that the mount unit 310 is fitted in the mount reception portion 121. The frame body 120 has therein the mirror unit 103 and serves also as the holing member for the mirror unit 103. The shutter unit 40 is supported by the frame body 120 in the state of being squeezed by the rear end portion of the frame body 120 and a shutter pressing plate 109 disposed on the backward side of the frame body.

Each component described above of the imaging apparatus 10 is mutually coupled (fixed) by a chassis made of metal material such as iron. In this embodiment, the chassis is constituted of a front chassis (not shown), side chassis 183 and a bottom chassis 184. These chassis take a role as a support member for supporting each component of the imaging apparatus 10. The chassis are fixed by vises, and the chassis integral structural body and the frame body 120 are fixed by vises to form an integral structural body. The tripod mount unit 185 is formed on the bottom chassis 184.

<Shake Correction Unit>

Next, with reference to FIG. 9, detailed description will be made on the structure of the shake correction unit 200. The shake correction unit 200 is constituted of the imaging device 101, the low-pass filter 108, an imaging device holder 201 for holding the imaging device 101 and the low-pass filter 108, a slider 202 for holding the imaging device holder 201, a radiation plate 203 disposed on the back plane of the imaging device 101, an imaging device substrate 204 disposed on the back plane of the radiation plate 203, a yaw direction actuator 205, a pitch direction actuator (not shown) and a shake board 207.

The imaging device substrate 204 is a substrate having substantially a rectangular shape on which the imaging device 101 is mounted with the radiation plate 203 being interposed between the imaging device 101 and imaging device substrate 204. The radiation plate 203 is made of predetermined metal and discharges heat generated while the imaging device 101 is driven (photoelectric conversion). The imaging device holder 201 is a frame body having a rectangular cross section, with the front and back portions being opened. In front of this frame body, the low-pass filter 108 is mounted. The imaging device 101 is disposed at the back of the low-pass filter 108. The imaging device substrate 204 is mounted on the imaging device holder 201 with screws in the state that the imaging device 101 together with the radiation plate 203 is pressed against the imaging device holder 201 by the imaging device substrate 204.

The shake board 207 is a so-called base board of the shake correction unit 200 to hold the slider 202 holding the imaging device holder 201.

In response to driving the yaw direction actuator 205 mounted on a side portion of the imaging device holder 201 in the up/down direction, the slider 202 and imaging device holder 201 are slid in unison in a right/left direction relative to the shake board 207 to thereby correct a shake of the imaging device 101 in the yaw direction. In response to driving the pitch direction actuator (not shown) mounted on a side portion of the imaging device holder 201 in the right/left direction, the imaging device holder 201 is slid in an up/down direction relative to the slider 202 to thereby correct a shake of the imaging device 101 in the pitch direction.

<Electrical Structure of Camera System 1>

Figure 10:
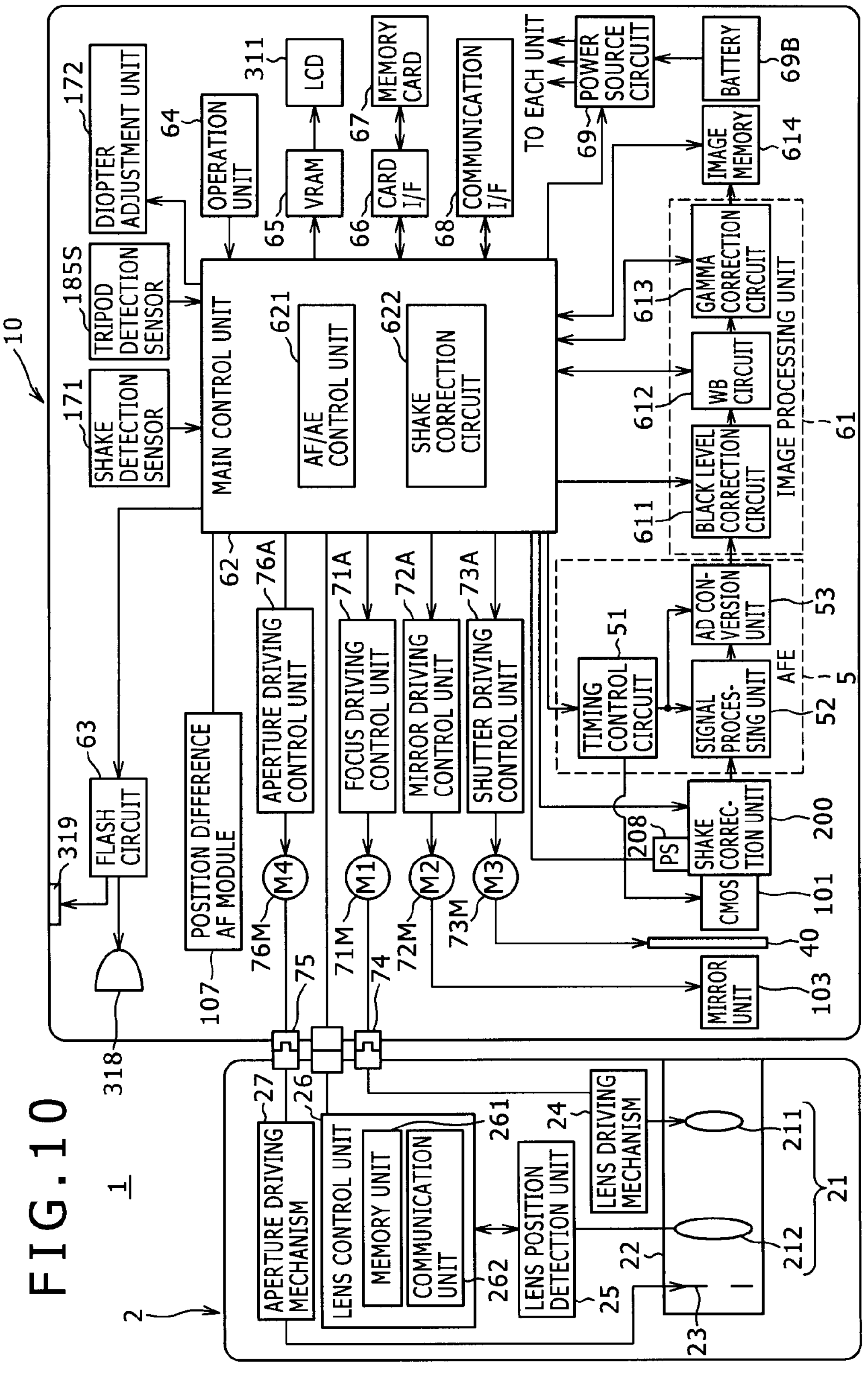
FIG. 10 is a block diagram showing an electrical structure of the whole camera system.

FIG. 10 is a block diagram showing the electrical structure of the whole camera system 1. Identical components to those shown in FIGS. 1 to 9 are represented by the same reference numerals. For the convenience of description, the electrical structure of the interchangeable lens 2 will be described first. The interchangeable lens 2 has, in addition to the lens group 21 and the camera cone 22 constituting the above-described imaging optical system, a lens driving mechanism 24, a lens position detection unit 25, a lens control unit 26 and an aperture driving mechanism 27.

The lens group 21 includes a focus lens 211, a zoom lens 212 and an aperture 23 for adjusting the amount of light incident upon the imaging device 101 in the imaging apparatus 10, respectively held in the camera cone 22 in the optical axis direction L, picks up an optical image of a subject, and focuses the optical image on the imaging device 101 and the like. The operations of changing a shot magnification factor (focal distance) and adjusting a focal point are performed by driving the lens group 21 in the optical axis direction L (FIG. 9) by an AF actuator 71M in the imaging apparatus 10.

The lens driving mechanism 24 is constituted of, e.g., a helicoid, a gear (not shown) for rotating the helicoid and the like. Upon the reception of a driving force from the AF actuator 71M via a coupler 74, the lens driving mechanism 24 moves the lens group 21 in unison in a direction parallel to the optical axis L. The motion direction and amount of the lens group 21 are determined by the rotation direction and number of the AF actuator 71M.

The lens position detection unit 25 has an encode plate having a plurality of code patterns formed at a predetermined pitch in the optical axis L direction in a motion range of the lens group 21, and an encoder brush moving together with the camera cone 22 and sliding on the encode plate, and detects a motion amount of the lens group 21 for focus adjustment.

The lens control unit 26 is made of a microcomputer having therein a memory unit 261 including, for example, a ROM for storing control programs, a flash memory for storing data of condition information, and the like. The lens control unit 26 has also a communication unit 262 for communications with a main control unit 62 of the imaging apparatus 10. The communication unit 262 transmits to the main control unit 62 condition information data such as a focal distance, an exit pupil position, an aperture value, an in-focus distance, respectively of the lens group 21, and a peripheral light amount condition, and receives from the main control unit 62, for example, drive amount data of the focus lens 211. During photographing, data such as focal distance information, an aperture value and the like after the completion of an AF operation is transmitted from the communication unit 21 to the main control unit 62. The memory unit 261 stores condition information data of the lens group 21, data transmitted from the main control unit 62 such as data of a drive amount of the focus lens 211.

The aperture driving mechanism 27 changes an aperture diameter of the aperture 23 by receiving a driving force from an aperture drive actuator 76M via a coupler 75.

Next, the electrical structure of the imaging apparatus 10 will be described. The imaging apparatus 10 is constituted of, in addition to the imaging device (CMOS) 101, the shake correction unit 200 for correcting a shake of the imaging device, the shutter unit 40 and the like, an analog front end (AFE) 5, an image processing unit 61, an image memory 614, the main control unit 62, a flash circuit 63, an operation unit 64, a VRAM 65, a card I/F 66, a memory card 67, a communication I/F 68, a power source circuit 69, a battery 69B, a focus driving control unit 71A and the AF actuator 71M, a mirror driving control unit 72A and a mirror driving actuator 72M, a shutter driving control unit 73A and a shutter driving actuator 73M, an aperture driving control unit 74A and the aperture driving actuator 74M, a position detection sensor (PS) 208, a diopter adjusting unit 172, and a tripod detection sensor 185S.

As described previously, the imaging device 101 is made of a CMOS color area sensor. A timing control circuit 51 to be described later controls the imaging operations of the imaging device 101 including starting (ending) an exposure operation, selecting an output of each pixel of the imaging device 101, reading a pixel signal and the like.

The AFE 5 supplies a timing pulse to the imaging device 101 to perform a predetermined operation, processes image signals (an analog signal group of pixels of the CMOS area sensor) output from the imaging apparatus 101 in a predetermined manner, converts the image signals into digital signals, and supplies the digital signals to the image processing unit 61. The AFE 5 has the timing control circuit 51, a signal processing unit 52, an A/D conversion unit 53 and the like.

In accordance with a reference clock output from the main control unit 62, the timing control circuit 51 generates predetermined timing pulses (pulses for generating a vertical scan pulse $\phi Vn$, a horizontal scan pulse $\phi Vm$, a reset signal $\phi Vr$ and the like), and outputs the timing pulses to the imaging device 101 to control the photographing operations of the imaging device 101. The predetermined timing pulses are also output to the signal processing unit 52 and the A/D conversion unit 53, respectively, to control the operations thereof.

The signal processing unit 52 processes analog image signals output from the imaging device 101 in a predetermined manner. The signal processing unit 52 has a correlation double sampling (CDS) circuit, an auto gain control (AGC) circuit, a clamp circuit and the like. The A/D conversion unit 53 converts analog R, G and B image signals output from the signal processing unit 52 into digital image signals each constituted of a plurality of bits (e.g., 12 bits), in accordance with the timing pulse output from the timing control circuit 51.

The image processing circuit 61 processes image data output from the AFE 5 in a predetermined manner to form an image file. The image processing circuit has a black level correction circuit 611, a white balance control circuit 612, a gamma correction circuit 613 and the like. The image data input to the image processing unit 61 is once written in an image memory 614 synchronously with reading the imaging device 101, and thereafter the image data written in the image memory 614 is accessed and processed by each block of the image processing unit 61.

The black level correction circuit 611 corrects the black level of each of R, G and B digital image signals A/D converted by the A/D conversion unit 53, to a standard black level.

The white balance correction circuit 612 performs level conversion (white balance (WB) adjustment) of a digital signal of each of R (red), G (green) and B (blue) color components, in accordance with a white reference matching a light source. Namely, the white balance control circuit 612 identifies a portion which is estimated essentially a white portion from data of luminance, chromaticness and the like of a subject, in accordance with the WB adjustment data supplied from the main control unit 62, calculates an average of R, G and B color components, a G/R ratio and a G/B ratio of the identified portion, and uses this as correction gains of R, B for level adjustment.

The gamma correction circuit 613 corrects tone characteristics of image data subjected to WB adjustment. Specifically, the gamma correction circuit 613 performs non-linear conversion and offset adjustment of image data level by using a gamma correction table preset for each of color components.

The image memory 614 is a memory which temporarily stores image data output from the image processing unit 61 and is used as a working area for the main control unit 62 to process the image data in a predetermined manner, in a photographing mode. In a reproduction mode, the image data read from the image card 67 is temporarily stored.

The main memory control unit 62 is made of a microcomputer having therein a memory unit such as a ROM for storing control programs and a flash memory for temporarily storing data, and controls the operation of each block of the camera system 1. The main control unit 62 has functionally an AF/AE control unit 621 and a shake correction control unit 622. The main control unit 62 has also a function of controlling a shutter operation of the imaging apparatus 10.

The AF/AE control unit 621 controls the operations necessary for auto focus (AF) control and auto exposure (AE) control. Namely, for the AF control, an in-focus control signal (AF control signal) is generated by performing a focal point adjusting process by a phase difference detection method using an output signal from the above-described focal point detection unit (phase difference AF module) 107, and activates the AF actuator 71M via the focus driving control unit 71A to drive the focus lens 211. For the AE control, a propter exposure amount (including a shutter speed and the like) of a subject is calculated in accordance with luminance information and the like of the subject detected with the AE sensor not shown in the drawings.

In a camera shake correction mode, the shake correction control unit 622 calculates a shake direction and a shake amount in accordance with shake detection signals from the above-described shake detection sensor 171, generates a shake correction control signal in accordance with the calculated shake direction and amount, and sends the shake correction control signal to the shake correction unit 200 to shift the imaging device 101 in a direction cancelling the camera shake. For example, for a servo control, the shake correction control unit 622 integrates an angular speed signal detected with the shake detection sensor 171 to obtain a shake amount (shake angle $\theta$), and calculates a motion distance $\delta 1$ ($\delta 1 = f \cdot \tan$) of the imaging device 101 corresponding to the shake angle $\theta$, in accordance with a lens profile of the interchangeable lens 2 such as a focal distance f. Position information δ2 of the imaging device 101 is acquired from the position detection sensor unit 208, and a drive signal for driving the imaging device 101 to satisfy δ1−δ2=0 is supplied to the shake correction unit 200.

In a flash photographing mode, the flash circuit 63 sets the emission amount of an external flash connected to the flash unit 318 or the connection terminal unit 319, to an emission amount set by the main control unit 62.

The operation unit 64 includes the above-described mode setting dial 305, control value setting dial 306, shutter button 307, setting button group 312, camera shake correction switch 313, multi-direction key 314, push button 315, main switch 317 and the like, and inputs operation information to the main control unit 62.

The VRAM 65 has a capacity sufficient for storing image signals corresponding to the pixel number of LCD 311, and functions as a buffer memory between the main control unit 62 and the LCD 311. The card I/F 66 is an interface for allowing signal transmission/reception between the memory card 67 and the main control unit 62. The memory card 67 is a recording medium for storing image data generated by the main control unit 62. The communication I/F 68 is an interface for allowing transfer of image data and the like to a personal computer and other external apparatus.

The power source circuit 69 has a constant voltage circuit and the like, and generates a voltage (e.g., 5 V) for driving the whole camera system 1 including controllers in the main control unit 62 and the like, the imaging device 101, and other drivers and the like. Power feeding control of the imaging device 101 is conducted by a control signal supplied from the main control unit 62 to the power source circuit 69. The battery 69B may be a primary battery such as an alkali dry battery, a secondary battery such as a nickel hydrogen rechargeable battery, and is a power source for supplying an electric power to the whole camera system 1.

The focus driving control unit 71A generates a driving control signal for the AF actuator 71M necessary for moving the focus lens 211 to an in-focus position, in accordance with the AF driving control signal supplied from the AF/AE control unit 621 in the main control unit 62. The AF actuator 71M is made of a stepping motor and the like, and supplies a driving force to the lens driving mechanism 24 of the interchangeable lens 2 via the coupler 74.

The mirror driving control unit 72A generates a drive signal for driving the mirror driving actuator 72M, synchronously with the photographing timing. The mirror driving actuator 72M is an actuator for allowing the mirror unit (quick return mirror) 103 to swing to a horizontal posture or slanted posture.

The shutter driving control unit 73A generates a driving control signal for the shutter driving actuator 73M in accordance with a control signal supplied from the main control unit 62. The shutter driving actuator 73M is an actuator for performing an open/close operation of the shutter unit 40.

The aperture driving control unit 76A generates a driving control signal for the aperture driving actuator 76M in accordance with a control signal supplied from the main control unit 62. The aperture driving actuator 76M supplies a driving force to the aperture driving mechanism 27 via the coupler 75.

The position detection sensor unit 208 detects a position of the imaging device 101 when shake correction is activated or the camera is activated. The position detection sensor unit 208 is constituted of a magnet unit which generates magnetic fluxes and a two-dimensional Hall sensor which outputs a signal corresponding to the intensity of magnetic fluxes radiated from the magnet unit. With this configuration, the position detection sensor unit 208 can detect a position of the imaging device 101 by making the two-dimensional Hall sensor detect a position of the magnet unit moving following an up/down and right/left motion of the imaging device holder 201 relative to the shake board 207.

The diopter adjusting unit 172 conducts diopter adjustment of the optical viewfinder 316 in accordance with a user input from the diopter adjusting dial 322.

The tripod detection sensor 185S is made of a contact sensor having a contact unit, and the like, and electrically detects whether a tripod (support legs) is mounted on the tripod mount unit 185 disposed on the bottom chassis 184 of the imaging apparatus 10.

<Diopter Adjusting Dial 322>

The imaging apparatus 10 has a structure for preventing an inadvertent handling of the diopter adjusting dial 322. Detailed description will now be made on the mount position of the diopter adjusting dial 322 and the shape of the eye cup 321 and the like relating to this preventive structure.

Figure 11:
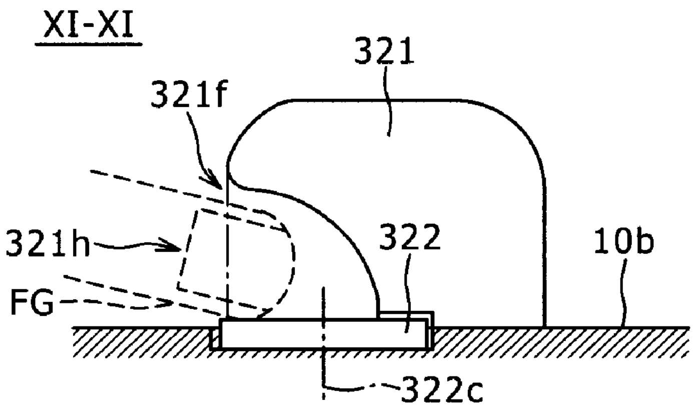
FIG. 11 is a cross sectional view taken along line XI-XI shown in FIG. 2.

FIG. 11 is a cross sectional view taken along position XI-XI shown in FIG. 2.

The diopter adjusting dial 322 is disposed on a rear plane 10*b* of the imaging apparatus 10, and can be rotated about a rotary shaft 322*c*. The diopter adjusting dial 322 is disposed at a position within an outer border Bd (FIG. 2) of the rear plane of the imaging apparatus 10 so as not to protrude from the outer border Bd.

A recess 321*h* (refer to FIG. 6) is formed in a partial region of the outer side of the eye cup 321 and above the diopter adjusting dial 322. The diopter adjusting dial 322 is accommodated substantially inside the recess 321*h*, although the diopter adjusting dial protrudes slightly from the opening edge 321*f* of the recess 321*h*. This opening edge 321*f* corresponds to the surface of the eye cup 321 on the assumption that the recess 321*h* is not formed in the eye cup 321.

The recess 321*h* of the eye cup 321 has a size allowing a finger tip FG to enter the recess. A user can therefore manipulate freely the diopter adjusting dial 322 by entering the finger tip FG into the recess 321*h* .

As described above, since the diopter adjusting dial 322 is disposed within the outer border Bd of the rear plane of the imaging apparatus 10, the diopter adjusting dial 322 will not protrude from the outer plane of the imaging apparatus 10. It is therefore possible to prevent a user's finger from erroneously touching the diopter adjusting dial 322 and to avoid inadvertent operation. Further, the recess 321*h* is formed in the partial region of the outer side of the eye cup 321, and the diopter adjusting dial 322 is accommodated substantially within the opening edge 321*f* of the recess 321*h*. Accordingly, most of the diopter adjusting dial 322 is hidden behind the eye cup 321 shown in FIG. 2 as viewed from the rear of the imaging apparatus 10 so that it is possible to prevent the diopter adjusting dial from being operated inadvertently.

Furthermore, since a space allowing the finger tip FG to enter is formed by the recess 321*h* of the eye cup 321 above the diopter adjusting dial 322, a user can visually recognize the surface of the diopter adjusting dial 322 obliquely downward from the recess 321*h*. Therefore, if characters (e.g., "+" and "−" indicating an increase/decrease direction) and the like representative of operation information are drawn on the surface of the diopter adjusting dial 321, it is possible to supply a user with beneficial information on the operation of the diopter adjusting dial 321.

The viewfinder of the imaging apparatus 10 for diopter adjustment is not limited to an optical viewfinder, but an eyepiece type viewfinder for electronically viewing a subject such as an electronic view finder (EVF) may also be used.

An operation member for diopter adjustment is not limited only to a dial type operation member rotating about a predetermined rotary shaft such as the above-described diopter adjustment dial 322, but it may be a slide type operation member linearly moving in a predetermined range.

<Flash Unit 318>

The flash unit 318 of the imaging apparatus 10 has the structure capable of avoiding a finger tip pain otherwise to be caused while the flash unit 318 is manually raised. This structure will be described below in detail.

Rod-like protrusions Va and Vb (FIGS. 5 to 8) are disposed on both sides of the flash unit 318, along borders Ba and Bb (FIGS. 5 to 7) between the flash unit 318 and housing 320 in the prostrate position Qa (FIG. 7) and lying just above the borders Ba and Bb. Each of the protrusions Va and Vb extends from the distal end of the flash unit 318 near to the rotary shaft Co (FIG. 8), and has a gently curved front end. The structures of the protrusions Va and Vb will be described in detail.

Figure 12:
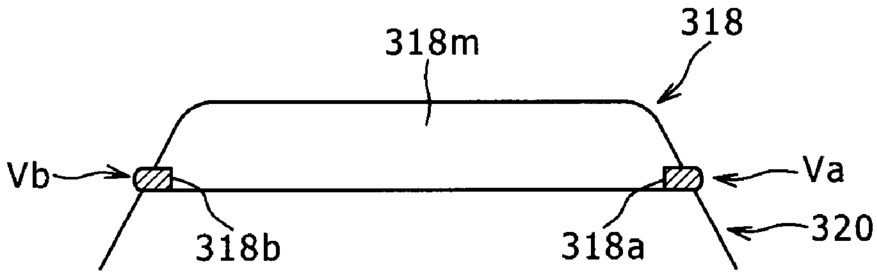
FIG. 12 is a schematic cross sectional view taken along line XII-XII shown in FIG. 5.
Figure 13:
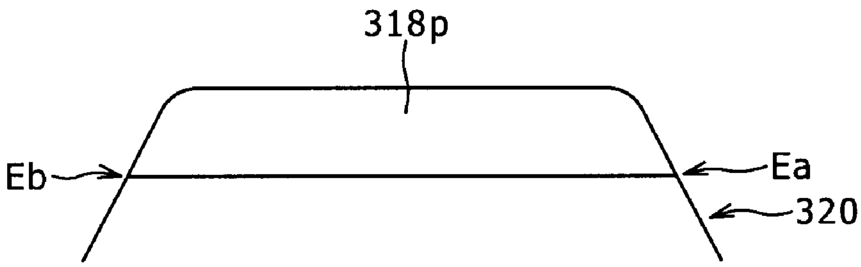
FIG. 13 is a diagram explaining that it is difficult to form protrusions Va and Vb integrated with a housing of a flash unit.

FIG. 12 is a schematic cross sectional view taken along position XII-XII in FIG. 5.

The flash unit 318 has a main body 318*m* with a flash unit built therein. Two rod-like members 318*a* and 318*b* with the protrusions Va and Vb having a round surface in the protrusion direction are mounted on right and left corners of the main body 318*m*. The rod-like members 318*a* and 318*b* as discrete members are mounted on the flash unit 318 because the protrusions Va and Vb having the round surface in the protrusion direction are to be formed. Namely, even if the protrusions Va and Vb are to be formed integrally with the housing of the flash unit by using a mold, lower right and left corners Eb and Ea of the housing 318*b* of the flash unit have an acute angle and it is difficult to form the rounded protrusions Va and Vb, because of manufacture restrictions when a mold is used.

As described above, since the rod-like protrusions Va and Vb are mounted on both sides of the flash unit 318, a contact area between finger tips and the protrusions Va and Vb becomes relatively large when a user presses the finger tips against the protrusions to raise the flash unit 318 in the prostrate position Qa. Pressure at the finger tips of the user can therefore be dispersed and it is possible to prevent a pain of the finger tips and uncomfortableness. Further, since the rod-like protrusions Va and Vb have the curved portions in the protrusion direction, a load on the finger tips can be mitigated.

Figure 14:
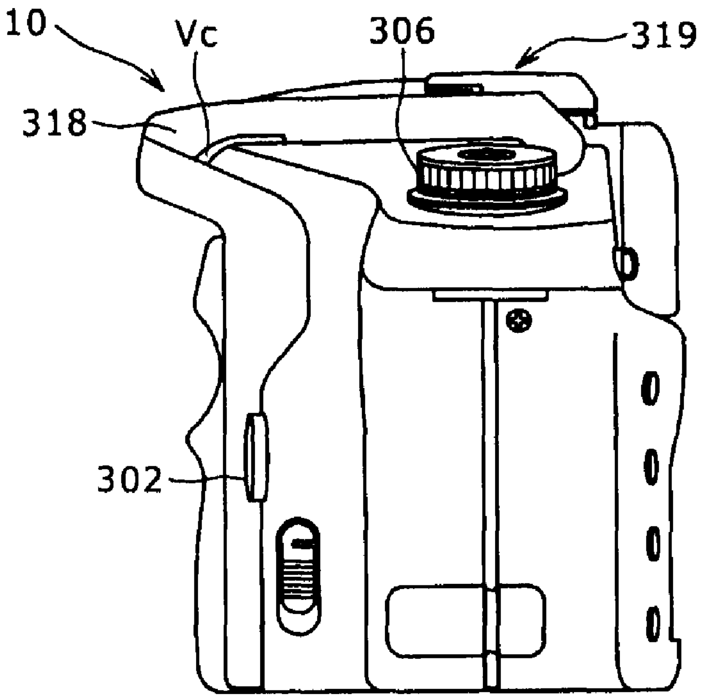
FIG. 14 is a diagram showing a rod-like protrusion Vc formed only in a distal end portion of the flash unit.
Figure 15:
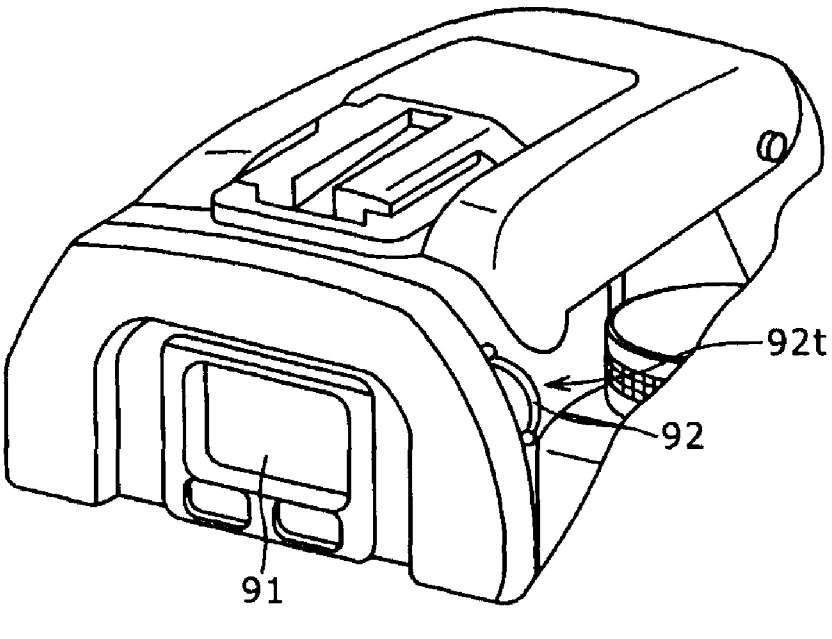
FIG. 15 is a diagram showing a diopter adjusting dial in a related art.

As shown in FIG. 14, the rod-like protrusion of the flash unit 318 may be a protrusion Vc formed only on the distal end side of the flash unit 318. The flash unit 318 can be raised with a smaller force at the distal end of the flash unit 318 away from the rotary shaft Co (FIG. 8) than at the position closer the rotary shaft Co. There is therefore a high possibility that a user raises the flash unit 318 by holding the distal end of the flash unit 318 with finger tips. Accordingly, if the rod-like protrusions are mounted at least on both sides of the distal end of the flash unit, it is possible to prevent a pain of finger tips when the flash unit 318 is raised. If the rod-like protrusions Va and Vb are formed extending from the distal end of the flash unit 318 close to the rotary shaft Co (FIG. 8), not only the distal end of the flash unit 318 but also the central portion thereof can be held with finger tips to raise the flash unit, thus improving user convenience. Also in this case, it is highly possible that a user raises the flash unit by holding the distal end of the flash unit 318 with finger tips, and the cross sectional area in the protrusion direction of the rod-like protrusions Va and Vb becomes larger at the position farther away from the predetermined rotary shaft Co (FIG. 8), thus improving user convenience.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2006-156005 filed in the Japanese Patent Office on Jun. 5, 2006, the entire contents of which being incorporated herein by reference.

What is claimed is:

1. An imaging apparatus comprising:

an eyepiece type viewfinder formed on a predetermined plane of the imaging apparatus;

an operation member for diopter adjustment of said viewfinder; and a light shielding member to suppress entrance of external light into said viewfinder, the light shielding member protruding from the predetermined plane around the viewfinder by a constant height, wherein the operation member is disposed not to protrude from an outer border of the predetermined plane, and the light shielding member includes a fingertip receptacle formed substantially above the operation member such that a height of the fingertip receptacle is less than the height of the light shielding member.

2. The imaging apparatus according to claim 1, wherein the fingertip receptacle in the light shielding member is formed in a partial region of an outer side of the light shielding member.

3. The imaging apparatus according to claim 1, wherein the light shielding member is mounted and dismounted relative to the predetermined plane.

4. A light shielding member for suppressing entrance of external light into a finder of an eyepiece type, and protruding from a predetermined plane of an imaging apparatus around the finder by a constant height, comprising:

a fingertip receptacle formed in the light shielding member;

an operation member to adjust a diopter of the finder being disposed in the imaging apparatus so as not to protrude from an outer border of the predetermined plane; and the fingertip receptacle is formed substantially above the operation member, such that a height direction of the fingertip receptacle is less than the height of the light shielding member.

5. A light shielding member for suppressing entrance of external light into a viewfinder of an eyepiece type, and protruding from a predetermined plane of an imaging apparatus around the viewfinder by a constant height, wherein the light shielding member has a fingertip receptacle formed substantantially above an operation member for diopter adjustment of the viewfinder disposed in the imaging apparatus such that a height direction of the fingertip receptacle is less than the height of the light shielding member.

6. The imaging apparatus according to claim 1, wherein the operation member is rotatable.

7. The imaging apparatus according to claim 1, wherein the operation member can only be accessed through the recess.

* * * * *